United States Patent [19]

Uhl

[11] Patent Number: 5,110,020
[45] Date of Patent: May 5, 1992

[54] TOTE BAG
[76] Inventor: Michael Uhl, 829 Myrna Dr., West Hempstead, N.Y. 11551
[21] Appl. No.: 635,276
[22] Filed: Dec. 28, 1990
[51] Int. Cl.⁵ .............................. B62J 7/00
[52] U.S. Cl. .................... 224/32 R; 224/31; 224/34
[58] Field of Search ........ 224/30 A, 31, 32 R, 224/34, 35, 36, 42.01, 151

[56] References Cited

U.S. PATENT DOCUMENTS

| 605,308 | 6/1898 | Deacon et al. | 224/35 |
| 614,005 | 11/1898 | Keeler | 224/35 |
| 4,068,786 | 1/1978 | Taniguchi | 224/151 |
| 4,720,027 | 1/1988 | Board | 224/35 |

FOREIGN PATENT DOCUMENTS 166577  8/1950  Austria ........................ 224/30 R Primary Examiner—Henry J. Recla
Assistant Examiner—David J. Walczak
Attorney, Agent, or Firm—Bauer & Schaffer

[57] ABSTRACT

A tote bag for carrying sundries and a bottle having top and bottom panels, and cooperating flaps provided with fasteners to hold the flaps and bag. The bag can also be adapted to be supported on the bar of the frame of a bicycle by provision of additional Velcro strips. The bag collapses around the bottle when not in use.

13 Claims, 3 Drawing Sheets

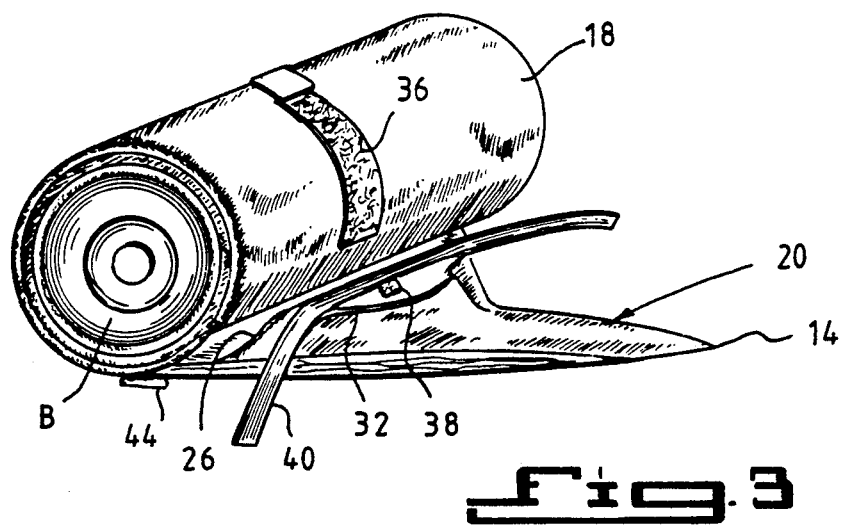
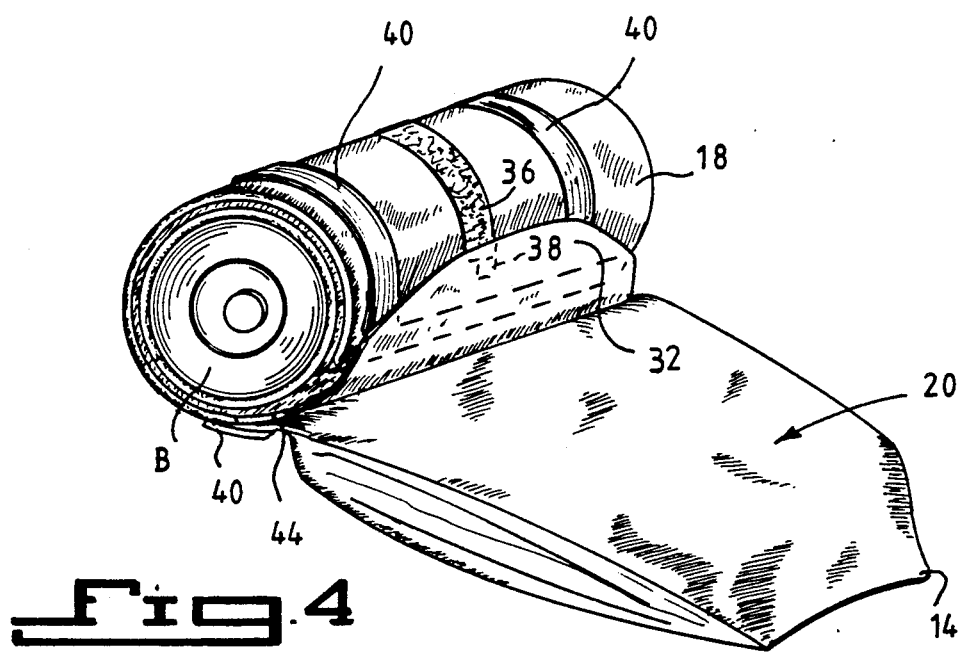
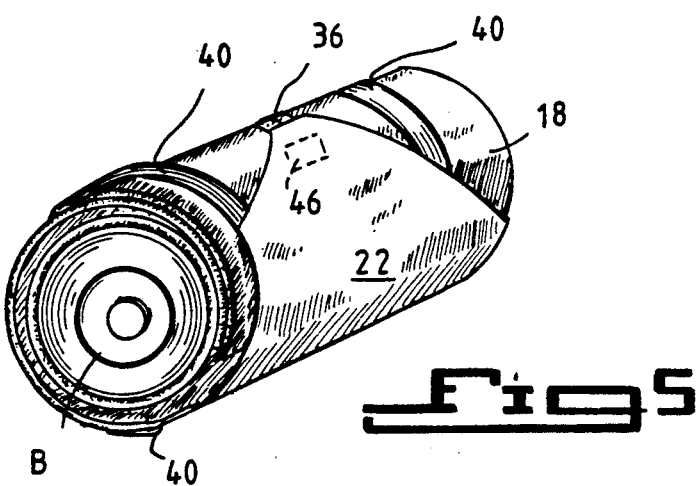

TOTE BAG

BACKGROUND OF THE INVENTION

The present invention relates to a tote bag and more particularly, to a carrier which can be employed to carry a bottle of liquid and various sundries during bicycle riding and hiking.

It is common and desirable for bicyclers to carry small amounts of supplies, such as drinking water or other liquid, food items such as sandwiches, snacks and the like during long trips or races. In my copending application, entitled "Nutrient Bottle", I have disclosed a bottle for holding liquids to be used by bicyclers, racers and the like. The present invention is intended to provide means for wrapping bottles of this type, as well as food and other paraphernalia to the bicycle or the like.

It is a particular object to provide a tote bag comprising a pouch capable of supporting, enclosing and insulating a bottle and various sundries in a neat, compact package which is convenient to carry by hand and/or to be attached to the bar of a bicycle frame.

It is another object of the present invention to provide a carrier which is compact in size and simple in construction while capable of carrying out the foregoing functions in an advantageous manner.

Further objects and advantages are set forth in the course of the following disclosure of the present invention.

BRIEF STATEMENT OF THE INVENTION

Briefly, according to the present invention, a bottle and sundry tote bag is provided which comprises an elongated, flexible pouch capable of being rolled or wrapped about a bottle which can also contain food and sundries and which is provided with closure means securing the pouch and allowing the carrier to be removably attached to the handle, cross-bar or similar rod-like support of the bicycle.

A tote bag for carrying sundries and a liquid refreshment bottle comprising a base sheet, the forward portion of which defines a bottom panel for a pouch having a top panel and side walls and having an access opening for introduction of sundries therein, the rear portion of said base sheet has an elongated flap extending in a direction away from said pouch and of sufficient size to the rolled with the liquid refreshment bottle about an axis transverse to the long axis of said base sheet, a second flap integrally formed with said top panel along a line transverse to the length of said base sheet and extending therefrom to overlay at least in part, the rolled elongated flap and cooperating to hold said bottom between it and the rolled elongated flap, fastening means disposed on free end of said integrally formed second flap on the surface facing said elongated flap, and on said elongated flap disposed along the middle of the surface thereof which forms the exterior surface of said elongated flap when said elongated flap is wrapped around said bottle, said fastening means cooperating to hold said second flap and rolled elongated flap securely to each other. In this construction, a bottle can be tightly wrapped between the flaps leaving the pouch freely depending therefrom or itself wrapped about the flaps as well.

Full details of the present invention are set forth in the folowing disclosure and in the accompanying drawings.

IN THE DRAWINGS

In order to understand the present invention more fully, reference is directed to the accompanying drawings which are to be taken in conjunction with the following detailed description of the invention and in which drawings:

FIG. 3 is a perspective view, showing the tote bag partially wrapped about a bottle;

FIG. 4 is a view similar to that of FIG. 3 showing a further aspect of wrapping;

FIG. 5 shows the tote bag fully wrapped about the bottle;

DESCRIPTION OF THE PREFERRED EMBODIMENTS

In the following, the tote bag, embodying the present invention, is generally depicted by the numeral 10 while the bottle, which may be of the type disclosed in my copending application or of a conventional type, is generally referred to by the letter B.

Figure 1:
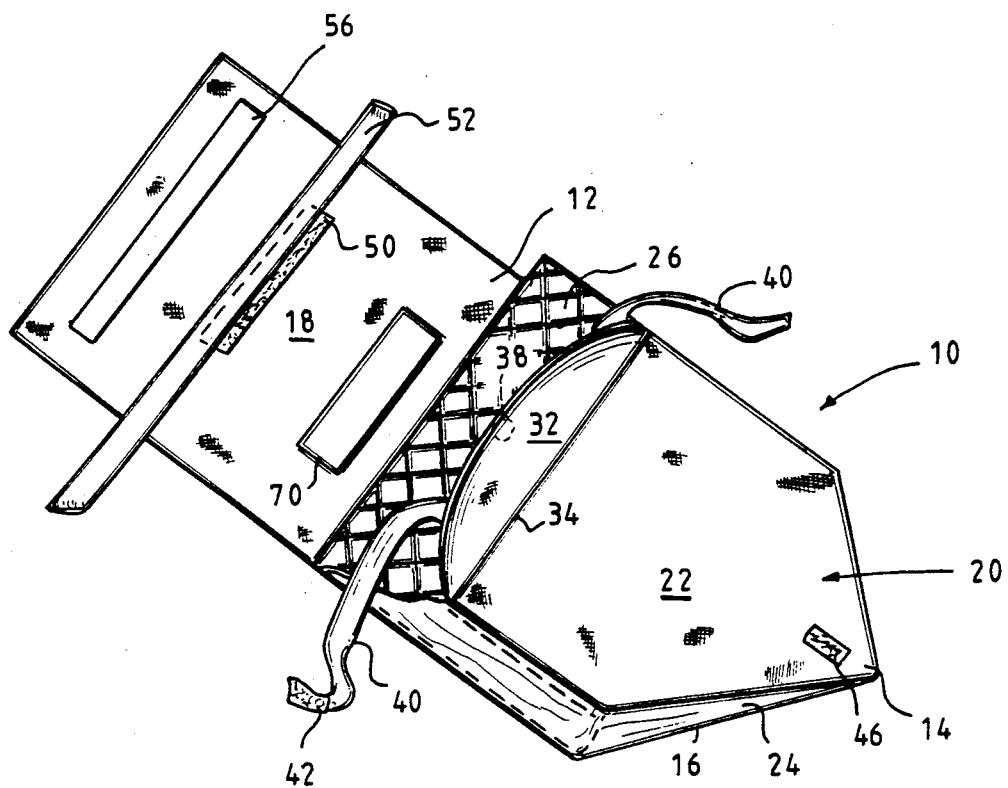
FIG. 1 is a perspective view of the tote bag embodying the present invention showing the same in an unwrapped or unrolled condition.
Figure 2:
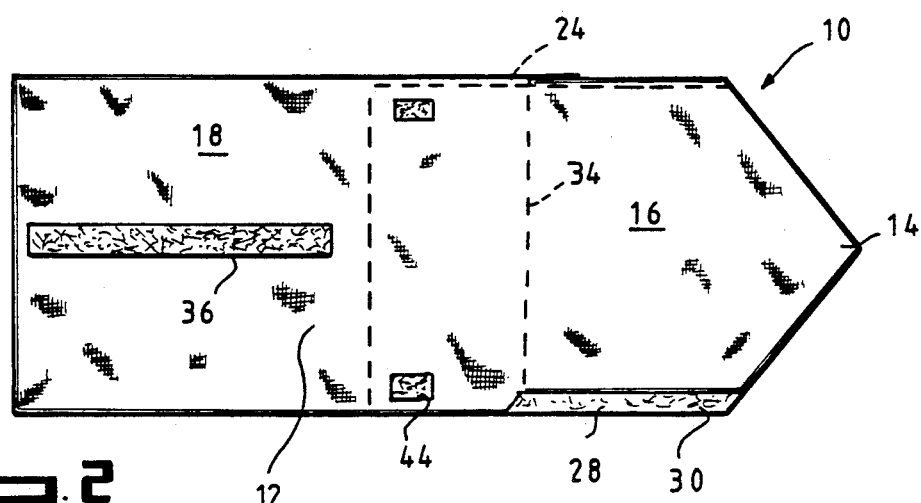
FIG. 2 is a bottom view of the tote bag shown in FIG. 1.

The tote bag 10, as seen in detail in FIGS. 1 and 2 comprises a generally rectangular base sheet 12, tapered at its front end 14, and defining front and rear portions 16 and 18 respectively of substantially equal size. The front portion 16 further defines the outer panel of a collapsible pouch, generally defined by the numeral 20, constructed by providing an inner panel 22 and side wall inserts 24 of a bloused shape. The rear end of the inner panel 22 is provided with a extruding bottom panel 26 which is adapted to provide a concave wall for the bottle B, as seen in FIG. 3. The rear portion 18 of the base sheet defines an elongated flap which is rollable about the bottle, as will be seen later. The respective panes and inserts are secured as by sewing, heat welding or adhesives about a portion of the common peripheral edges, leaving an access opening 28, which is provided with closure means 30, preferably of the "zipper type". The sewing should be such as to enable rolling of the bag in a smooth, easy manner, preferably with the raw edges of the fabric material with the exterior.

Extending upward from the surface of the inner panel 22 is a flap 32 such as an arcuate or square shaped tongue having its long edge 34 integrally attached, parallel to the transverse bottom panel 26, so that it is foldable in cooperation with the bottom panel 26 to hold the bottle B. It is preferred that the bottom panel 26 is made of mesh or of noninsulating material so that heat or cold transfers between the bottle B and the contents of the pouch 20 most readily.

The wrapping of the tote bag 10 about the bottle B is illustrated in FIGS. 3 to 5. This is accomplished by placing the bottle on the rear portion 18 of the base sheet 12, (positioned as seen in FIG. 1) transverse to the long axis of the base sheet. The rear portion 18 is then rolled together with the bottle toward the bottom wall 26 of the pouch 20. As will be seen in FIG. 3, the bottom panel 26 sets up, in the wrapping, as a concave barrier conforming to the shape of the bottle B. This barrier acts to fix the bottle in place.

Figure 6:
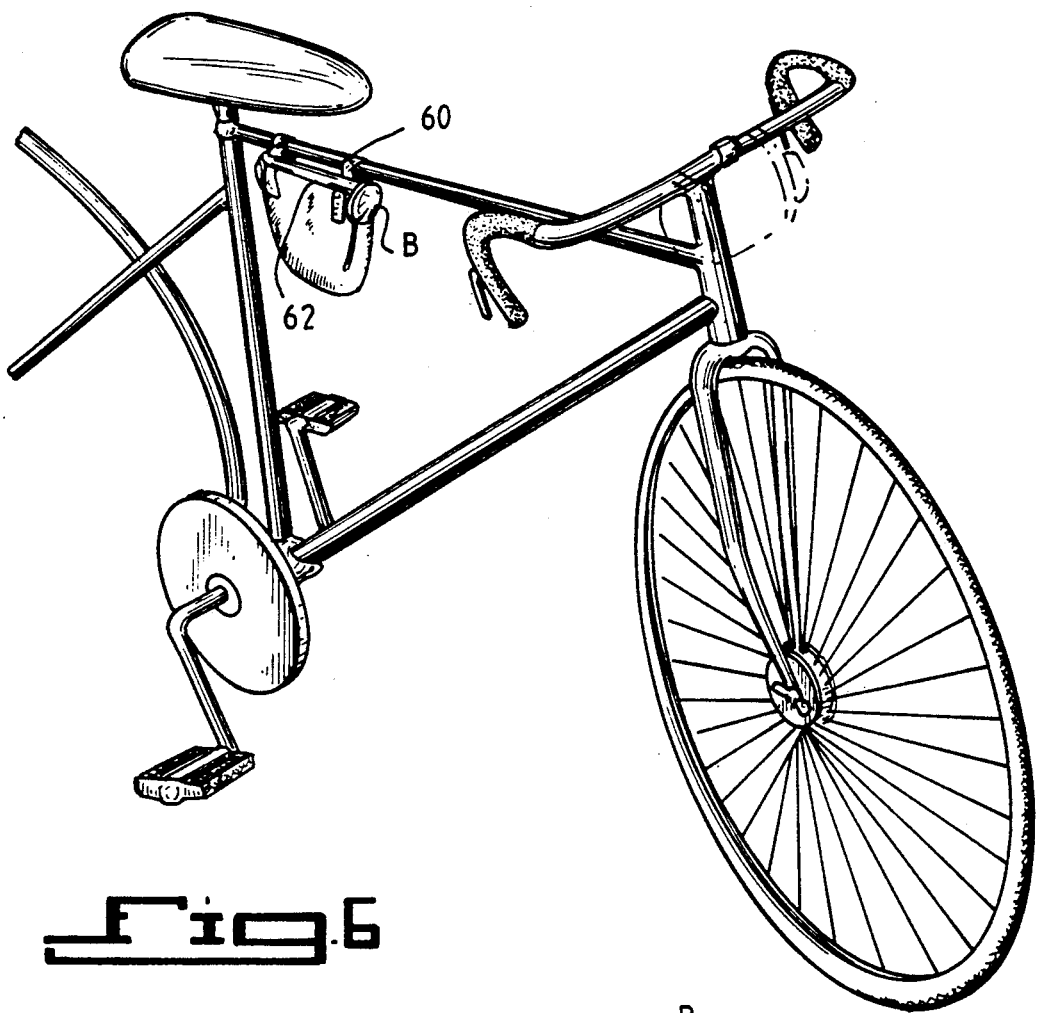
FIG. 6 is a perspective view of the tote bag slung from a bicycle.

A longitudinal strip 36 of Velcro is secured on the outer surface of the rear portion 18 of the sheet 12 while a mating tab 38 is secured on the under side of the flap 32. Thus, as the bottle is rolled, the flap 32 may be adhered to the rear portion 18 of the base sheet as shown in FIG. 3. To more securely hold the bottle B between the flap 32 and rear portion 18 of the base sheet 12 firmly against the concave wall 26, the flap 32 is provided with a pair of laterally spaced straps 40 having Velcro tabs 42 at their free ends, while the outer surface of the front portion 16 of the base sheet 12 is provided with a correspondingly arranged pair of mating Velcro tabs 44. The straps 40 are adapted to secure the bottle in belt-like fashion as seen in FIG. 4 and are of such length that they may be strung, if desired, over the bar of a bicycle to hold the bag to the bicycle, as seen in FIG. 6. In this manner, the pouch 20 can extend freely and be capable of expansion for filling with food, sundries and the like, while at the same time, the cylinder formed about the bottle maintains its shape, fully wrapping the bottle, yet permitting the bottle top to be available for the user to drink from.

When the pouch 20 is completely empty, it is collapsible and may be rolled about the bottle to provide complete bottle insulation. The tapered end 14 of the inner panel 22 is provided with a Velcro tab 46 in line with the Velcro strip 36 which will secure the pouch to the remainder of the tote bag as seen in FIG. 5.

Figure 7:
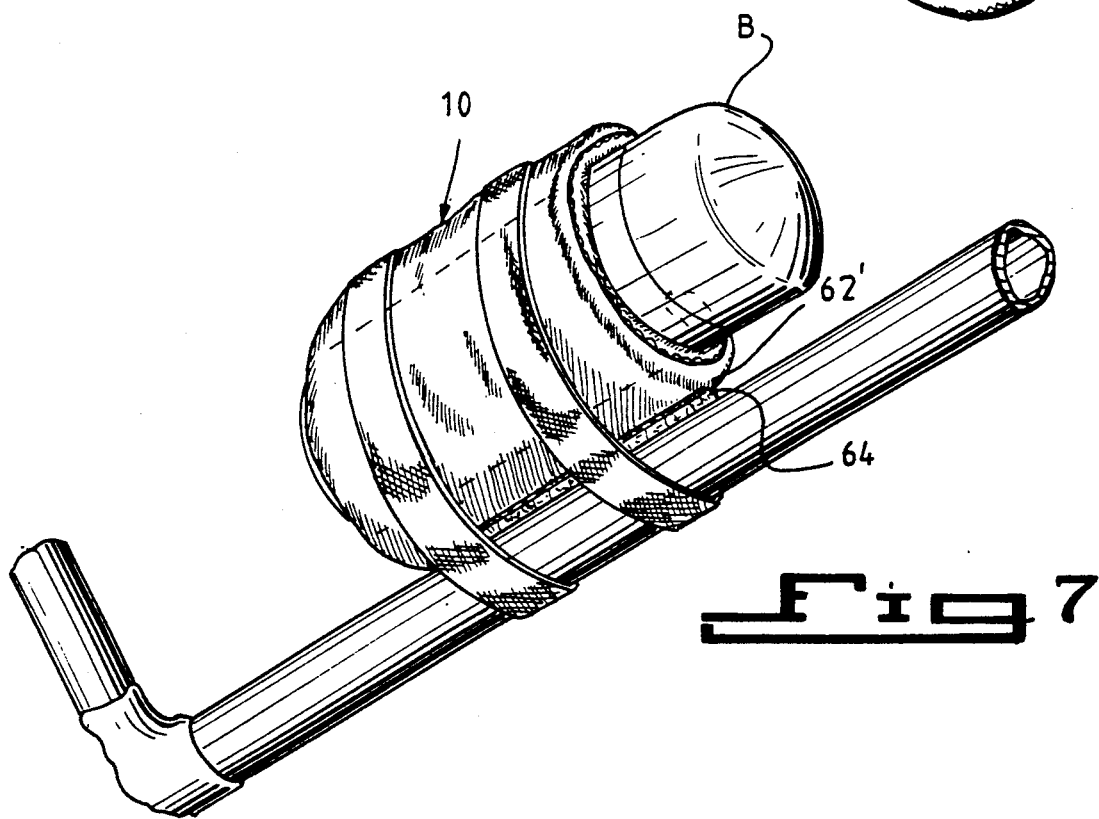
FIG. 7 is another view showing the tote bag attached to the bar of a bicycle.

Various additional features can be provided for as for example, if it is desired to hold the bag or the bottle from the shoulder, a Velcro strip 50 may be placed transversely on the upper surface of the rear portion 18 so that a shoulder strap 52 can be removably attached to it and captured between the bag and the bottle when the two are wrapped. Similarly, if it is desired to insure a very stable wrapping of the bottle and one that would not permit the bottle to shift another Velcro strip 56 is applied to the surface of the rear portion 18. The bottle B will, of course, have to be provided with cooperating Velcro means. The outer surfaces of the base sheet 12 can also be provided with a Velcro strip which will enable the tote bag and bottle to be removably attached to other parts of a bicycle or other vehicle, as for example. In FIG. 6, the pair of spaced straps 60 are shown attached to mating surfaces on the bag after being slung over the bicycle bar. In FIG. 7, an additional transverse strip 62 of Velcro is provided which mates with a similar strip 64 permanently adhered to the bicycle bar.

It was previously noted that the section 26 of the inner panel 22 is preferably mesh to provide for efficient heat transfer and improved thermodynamics between the contents of the bottle and pouch. On occasion, particularly during extreme temperature conditions, the bottle or food content will cause one or the other to sweat. This problem is easily overcome by merely slipping a terry cloth or other absorbent piece of toweling or the like, over either the bottle or the mesh section. If it is desired to add heat or cold to either the food in the pouch or the bottle a small bag 70 containing a chemical heat composition or dry ice may be inserted between the bottle and the mesh section 26 before wrapping the bottle.

It will be apparent that the tote bag, when wrapped around a liquid container, forms a neat, compact package providing insulation for the bottle keeping any contents thereof warm or cold, as the case may be. When the bag contains items such as food, towels, clothing such as swim suits and the like, the pouch hangs open from the bicycle bar and the closure, i.e. the "zipper" is readily accessible, for use even when the bicycle is in movement. The bag, as a whole, is easily removed and replaced. The bottle, on the other hand, is easily removable even when the bag is slung from the bicycle, as it can be easily pulled out from the cylindrical insulating pocket formed when it is rolled. It may be easily replaced since the cylinder retains its shape due to the fastening.

While Velcro patches or strips have been described, it will be obvious that other self-adhesive quick release fastening means or mechanical fasteners such as snaps, hooks and eyes and the like, may be substituted for all or only some of the cooperating Velcro fasteners. Furthermore, the fabric forming the pouch panels and flaps may themselves be of Velcro, so that all surfaces comprise a portion of the fastening means.

The fabric used in the construction of the present tote bag is preferably a foam coated neoprene fabric of the type common in the construction of scuba divers' wet suit. The material is highly flexible, strong and above all, thermodynamically insulating. On the other hand, foam coated canvas and multilayered quilt-like fabrics may also be used.

Various modifications embodiments and the like, have been disclosed. Other changes and modifications will be obvious to those skilled in the art. Therefore, it is intended that the present disclosure not be taken as limiting, but only illustrative of the invention.

What is claimed is:

1. A tote bag for carrying sundries and a liquid refreshment bottle comprising a base sheet having a longitudinal axis, a transverse axis, a forward portion and a rear portion, the forward portion of said base sheet defining a bottom panel for a pouch having a top panel and side walls and having an access opening for introduction of sundries therein, the rear portion of said base sheet has an elongated flap extending in a direction away from said pouch and of sufficient size to be rolled with the liquid refreshment bottle about an axis transverse to the longitudinal axis of said base sheet, a second flap integrally formed with said top panel along a line transverse to the length of said base sheet, and extending therefrom to overlay at least in part the rolled elongated flap and cooperating to hold said bottle within the rolled elongated flap, fastening means disposed on said integrally formed second flap on the surface facing said elongated flap, and on said elongated flap disposed in alignment therewith on the surface thereof which forms the exterior surface of said elongated flap when said elongated flap is wrapped around said bottle, said fastening means cooperating to hold said second flap and rolled elongated flap securely to each other.

2. The tote bag according to claim 1, wherein said second flap is provided with at least one extending strap having fastening means at its end and the outer surface of said elongated flap is provided with mating fastening means whereby said elongated and second flaps can be joined about a supporting bar to hold said bag to the bar.

3. The tote bag according to claim 1, wherein said top panel and said side walls are being disposed to permit said pouch to collapse when empty, and to provide a base wall parallel to said bottle against which said bottle abuts when rolled within said flaps.

4. The tote bag according to claim 3, wherein said pouch and said elongated flap are provided with cooperating quick release fasteners whereby said pouch, when empty, can be rolled about said bottle.

5. The tote bag according to claim 1, wherein said fastening means is Velcro.

6. The tote bag according to claim 1, wherein said access opening is provided with a "Zipper".

7. A tote bag according to claim 1 which is capable of being supported on a bar of the frame of a bicycle and includes a pair of Velcro strips disposed on the surface of the top panel near the edge of the sides thereof and the elongated flap is provided with a pair of elongated Velcro strips disposed near the side edges, and on the surface thereof which forms the exterior surface of said elongated flap when it is wrapped around a bottle and said elongated Velcro strip cooperating with said pair of Velcro strips to support said tote bag on said bar of a frame of said bicycle.

8. A tote bag according to claim 4, including a Velcro strip extending across the surface of the elongated flap and across the elongated Velcro strips near the ends thereof.

9. A tote bag for carrying sundries and a liquid refreshment bottle comprising a base sheet having a longitudinal axis, a transverse axis, a forward portion and a rear portion the forward portion of said base sheet defining a bottom panel for a pouch having a top panel and side walls and having access opening for introduction of sundries therein, the rear portion of said base sheet defining an elongated flap extending in a direction away from said pouch and of sufficient size to be rolled with the liquid refreshment bottle about an axis transverse to the longitudinal axis of said base sheet, said top panel and side walls being disposed to permit said pouch to collapse when empty, and to provide a base wall parallel to said bottle wherein said collapsed pouch overlaps said elongated flap when said bottle is rolled within said elongated flap, fastening means for securing said collapsible pouch to said rolled flap.

10. A tote bag for carrying sundries and a liquid refreshment bottle comprising a base sheet having a longitudinal axis, a transverse axis, a forward portion and a rear portion, the forward portion of which defines a bottom panel for a pouch having a top panel and side walls and having an access opening for introduction of sundries therein, the rear portion of said base sheet has a first elongated flap extending in a direction away from said pouch and of sufficient size to be rolled with the liquid refreshment bottle about the transverse axis, and a second elongated flap extending transversely to said first elongated flap to in part overlie said first elongated flap when rolled about said bottle, said top panel and bottom panel having a portion between said elongated flaps forming an interfacing surface providing a thermodynamic exchange wall between said pouch and at least a portion of said wrapped bottle, and fastening means cooperating to hold said rolled flaps and said thermodynamic exchange wall securely.

11. The tote bag according to claim 10, wherein said thermodynamic wall is formed of porous material.

12. The tote bag according to claim 11, including an absorbent insert positionable between said thermodynamic wall and said bottle.

13. The tote bag according to claim 11, including a hot and/or cold transfer means.

* * * * *